J. BOSNYAKOVITS.
LAMP BRACKET.
APPLICATION FILED MAY 20, 1909.
929,381.
Patented July 27, 1909.
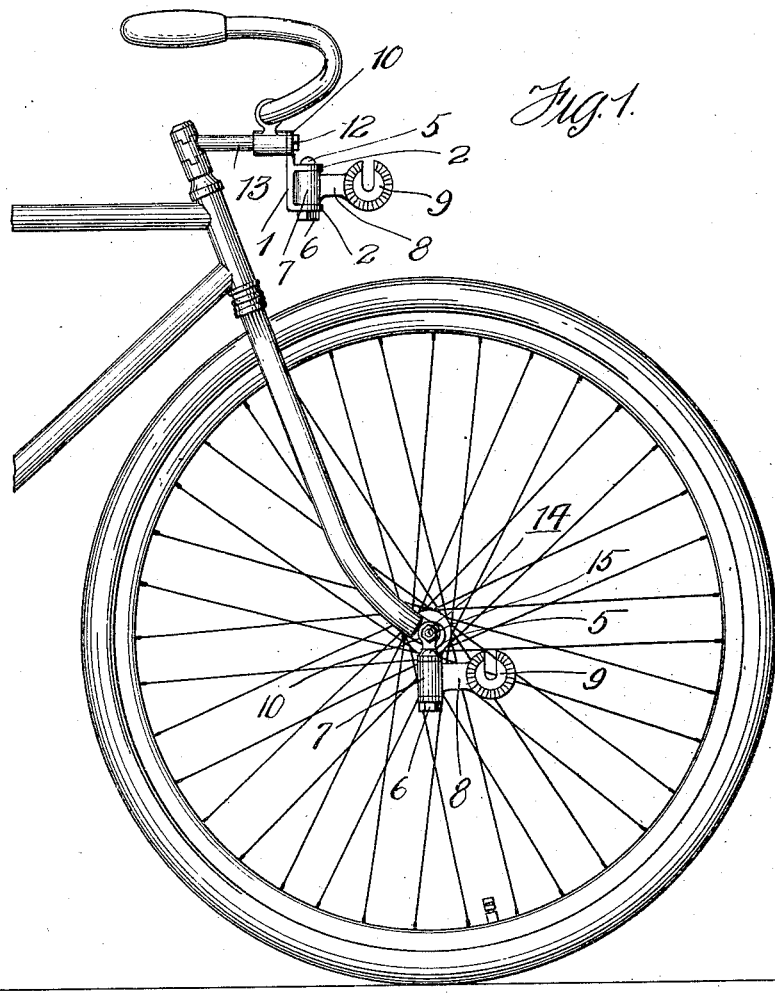
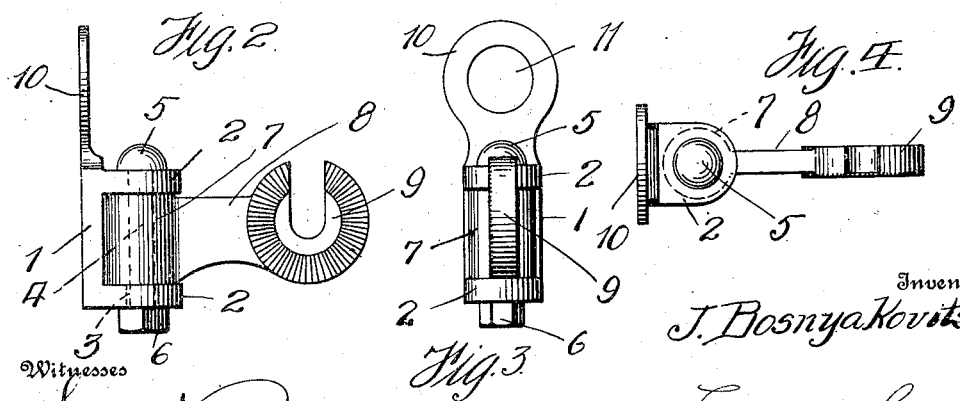

UNITED STATES PATENT OFFICE.

JOSEPH BOSNYAKOVITS, OF CLEVELAND, OHIO.

LAMP-BRACKET.

No. 929,381.      Specification of Letters Patent.      Patented July 27, 1909.

Application filed May 20, 1909. Serial No. 497,323.

*To all whom it may concern:*

Be it known that I, JOSEPH BOSNYAKOVITS, a subject of the King of Hungary, residing at Cleveland, in the county of Cuyahoga and State of Ohio, have invented certain new and useful Improvements in Lamp-Brackets, of which the following is a specification, reference being had therein to the accompanying drawing.

This invention relates to a lamp bracket, for bicycles, and the object of my invention is to provide a novel bracket of a simple and inexpensive construction that can be attached to the handle bar support of a bicycle or to the front axle or hub of the bicycle.

Another object of this invention is to provide an adjustable lamp holder for supporting a lamp or lantern at a desired angle relative to a bicycle.

These, and such other objects as may hereinafter appear, are attained by a metallic lamp bracket that will hereinafter be described in detail and then specifically claimed, and reference will now be had to the drawing forming part of this application, wherein there is illustrated a preferred embodiment of the invention, but it is to be understood that the structural elements thereof can be varied or changed without departing from the spirit and scope of the invention.

In the drawings, Figure 1 is an elevation of a portion of the bicycle provided with the lamp bracket, Fig. 2 is an enlarged side elevation of the lamp bracket, Fig. 3 is a front elevation of the same, Fig. 4 is a plan of the lamp bracket.

In the accompanying drawings, 1 designates a plate having the upper and lower ends thereof provided with lateral parallel lugs 2, having vertically alining openings 3 formed therein for a pivot bolt 4, said bolt having a head 5 at one end and the opposite end threaded to receive a nut 6.

7 denotes a sleeve loosely held between the lugs 2 by the bolt 4, said sleeve having an extension 8 provided with a slotted enlargement or socket 9 for the ordinary type of bicycle lamp or lantern, (not shown).

10 designates a vertical hanger carried by the upper end of the plate 1, said hanger conforming in shape to a loop having an opening 11 to receive fastening means employed for retaining the bracket in engagement with the bicycle.

As shown in the upper part of Fig. 1, a set screw 12 extends through the opening 11 of the hanger 10, and maintains the bracket in engagement with the handle bar support 13 of the bicycle. As shown in the lower part of Fig. 1, the hanger 10 is retained in engagement with the end of the hub or forward axle 14 of the bicycle by a nut 15. In this instance, the extension 8 and the socket 9 thereof are positioned at right angles to the lugs 2.

The plate 1 and the lugs 2 are preferably made of malleable metal, whereby the lugs 2 can be sprung against the upper and lower ends of the sleeves 7 by tightening the nuts 6, to hold the sleeve 7 fixed relative to the plate 1 and the extension 8 and the socket 9 at a desired inclination relative to the bicycle.

It is thought that the utility of the bicycle lamp bracket will be apparent without further description and I reserve the right to make the socket 9 of various shapes, to accommodate various types of lamps.

Having now described my invention, what I claim as new, is:—

A lamp bracket for bicycles, comprising a plate, parallel apertured malleable lugs carried by said plate, a bolt adjustably mounted in said lugs, a sleeve loosely mounted upon said bolt between said lugs and adapted to be frictionally held thereby, an extension carried by said sleeve and provided with a lamp socket, and a hanger carried by the upper end of said plate to facilitate the fastening of the bracket to a bicycle, substantially as described.

In testimony whereof I affix my signature in the presence of two witnesses.

JOSEPH BOSNYAKOVITS.

Witnesses:
    FRANK MAGYAR,
    NICHOLAS BAPP.